(12) United States Patent
Rowland et al.

(10) Patent No.: US 7,126,876 B1
(45) Date of Patent: Oct. 24, 2006

(54) HARMONIC AMBIGUITY RESOLVER AND INTER ARRAY HARMONIC TRACKER

(75) Inventors: Raymond J. Rowland, Noank, CT (US); Denman E. Sweetman, Exeter, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/183,315

(22) Filed: Jul. 15, 2005

(51) Int. Cl.
G01S 3/80 (2006.01)
G01S 13/66 (2006.01)

(52) U.S. Cl. .................... 367/124; 342/90; 367/118
(58) Field of Classification Search ............ 367/118, 367/124, 125; 342/90
See application file for complete search history.

(56) References Cited

U.S. PATENT DOCUMENTS

| | | | |
|---|---|---|---|
| 3,978,287 A | | 8/1976 | Fletcher et al. |
| 5,034,931 A | | 7/1991 | Wells |
| 5,481,505 A | * | 1/1996 | Donald et al. ............ 367/124 |
| 5,812,737 A | * | 9/1998 | Wang ...................... 704/207 |
| 6,173,074 B1 | | 1/2001 | Russo |
| 6,381,330 B1 | | 4/2002 | Johanson |
| 6,901,030 B1 | * | 5/2005 | Owen, IV et al. ......... 367/124 |
| 7,046,582 B1 | * | 5/2006 | Kosalos et al. ........... 367/88 |

* cited by examiner

*Primary Examiner*—Ian J. Lobo
(74) *Attorney, Agent, or Firm*—James M. Kasischke; Michael P. Stanley; Jean-Paul A. Nasser

(57) ABSTRACT

The present application discloses a method for resolving harmonic ambiguity and inter-array harmonic tracking. The method allows derivation of a complete set of possible harmonic families given the selection (by an operator) or automatic detection (by an automated algorithm) of a single tone ($f_{selected}$) from a frequency spectrum using a novel "ambiguity matrix" approach in which a matrix of all N possible harmonic members and M hypothetical fundamentals is constructed. The ambiguity matrix provides an image of all possible harmonic families associated with a selected tone. The selection of the correct fundamental is then made based on simple comparisons between this image and the set of all possible fundamentals. The ambiguity matrix effectively provides a reduced finite solution space (discrete set of possibilities) in which to unambiguously estimate the correct fundamental.

18 Claims, 1 Drawing Sheet

HARMONIC AMBIGUITY RESOLVER AND INTER ARRAY HARMONIC TRACKER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of Invention

The invention relates to signal processing approaches for tracking systems and, more particularly, to a method for resolving harmonic ambiguity and inter array harmonic tracking that calculates a complete set of possible harmonic families given the automatic or manual selection of a target frequency from a frequency spectrum.

(2) Background of the Invention

Tracking systems utilize radiating beam-forming sources to probe an area to be searched so as to detect objects. For example, in conventional sonar devices a highly directional beam of sonic energy periodically radiates from a scanning transducer, and a receiver detects echoes reflected from object(s) within range. Modern active sonar systems commonly provide multibeam capabilities as well.

A detectable target typically return-radiates signals over a wide bandwidth. However, only energy from a single frequency is used for target detection in conventional passive sonar systems. Since only a fractional part of the total energy is present at any given frequency, this places a significant constraint on detection ability of conventional circuitry. When uncorrelated noise and clutter is added to the radiated signals, it becomes more and more difficult to identify target signals amidst the noisy signals. Thus, in a high noise environment, the resulting low signal to noise ratio of the target signature results in a generally unacceptable trade-off between no detection or unacceptable false alarms. The target signature will comprise a "fundamental" frequency together with an infinite number of harmonics, the amplitude of the Nth harmonic being 1/N of the amplitude of the fundamental component. The target signature is embedded in a noisy signal. The trick then is to resolve the target signature from amidst the noise despite ambiguity. Prior efforts have been undertaken to pursue this goal.

For example, U.S. Pat. No. 5,034,931 to Wells discloses a method for enhancing target detection through the processing of the fundamental frequency and a plurality of harmonics that are embedded in background noise. Signals comprising a fundamental frequency signal ($f_o$) and a plurality of harmonic frequency signals ($2f_o$, $3f_o$ . . . $nf_o$) embedded in the background noise are received for processing. The plurality of harmonic frequencies are processed to determine the background noise level and to determine which of the harmonic frequency signals contain harmonics of the fundamental frequency signal. The fundamental frequency signal and those harmonic signals that are harmonics thereof are integrated to provide a summed signal. The summed signal is then processed by comparing it to a threshold level that is a function of the background noise level to provide an enhanced target detection signal. The enhanced target detection signal is then displayed on a monitor.

In addition to the Wells '931 threshold approach, other types of signal processing include broad-band amplification, narrow band filtering, variable gain, automatic gain control (AGC), use of an adaptive filter for noise cancellation, neural net identification, FFT or wavelet-based analysis or decomposition, joint time frequency analysis, transfer functioning correlation techniques, template matching, beam-forming algorithms, timing measurements, harmonic analysis, use of decision trees, comparison with a data base and auto-calibration.

Unfortunately, the Wells '931 and other known automatic harmonic detection algorithms suffer from the ambiguity associated with the existence of multiple probable solutions. For example, a given harmonic set $H=f_o*[1\ 2\ 3\ 4\ 5\ 6\ 7\ 8\ 9\ . . .]$ will result in other possible sub-harmonic sets being selected such as $J=f_o*[2\ 4\ 6\ 8\ . . .]$ or $K=f_o*[3\ 6\ 9\ 12\ 15\ . . .]$, etc. These solutions are difficult to resolve in cases where the individual components vary in intensity from member to member. In the case where there is an intensity (power) distribution that coincides with even (or odd) harmonics the associated sub-harmonic set (i.e., J or K) can produce a more likely solution (i.e. total energy) than the set produced from the actual fundamental (i.e., H).

Another drawback to the traditional approaches is the existence of an infinite solution space, over which the search must be performed, thus requiring significant effort and/or computational overhead to resolve.

It would be greatly advantageous to provide a more practical and efficient method for resolving harmonic ambiguity and inter array harmonic tracking capable of calculating a complete set of possible harmonic families given the selection (by an operator) or automatic detection (by an automated algorithm) of a single tone ($f_{selected}$) from a frequency spectrum using a novel "ambiguity matrix" approach in which a matrix of all N possible harmonic members and M hypothetical fundamentals is constructed. An ambiguity matrix would provide the operator with an image of all possible harmonic families associated with the selected tone. The selection of the correct fundamental could then be based on simple comparisons between this image of the set of all possible fundamentals. This ambiguity matrix would effectively provide a greatly-reduced and finite solution space (a discrete set of possibilities) in which to unambiguously estimate the correct fundamental.

SUMMARY OF THE INVENTION

Accordingly, it is an object of the present invention to provide a method for resolving harmonic ambiguity capable of calculating a complete set of possible harmonic families given the selection (by an operator) or automatic detection (by an automated algorithm) of a single tone ($f_{selected}$) from a frequency spectrum.

It is another object of the present invention to provide a method as described above that constructs a novel "ambiguity matrix" comprising all N possible harmonic members and M hypothetical fundamentals to provide an operator with an image of all possible harmonic families associated with a selected tone.

It is another object of the present invention to provide a method as described above which will allow an operator to select a correct fundamental frequency from a set of possible harmonic families based on simple comparisons between an image of the set of all possible fundamentals.

It is still another object of the present invention to provide a method as described above that constructs an ambiguity matrix comprising a greatly-reduced and finite solution space (a discrete set of possibilities) in which to unambiguously estimate the correct fundamental.

According to the above-described and other objects, the present invention is a method for resolving harmonic ambiguity and inter array harmonic tracking. The method calculates a complete set of possible harmonic families given the selection (by an operator) or automatic detection (by an automated algorithm) of a single tone ($f_{selected}$), from a frequency spectrum. The selected tone need not be the fundamental of the harmonic set. The operator (or a post processing algorithm) is presented with a decision space consisting of an N×M ambiguity matrix (image) of all N possible harmonic members and M hypothetical fundamentals, where N=[set of integers from 1 to N], and M=[fundamental hypothesis $\{f_o = f_{selected}/(1 \text{ thru } N)\}$].

The present method assumes the selected tone ($f_{selected}$) is a harmonic partial of a harmonic set (i.e., if the selected tone is the $n^{th}$ harmonic partial, n must be less than or equal to N). The ambiguity matrix provides the operator with an image of all possible harmonic families associated with the selected tone. The selection of the correct fundamental is based on comparisons between this image of the set of all possible fundamentals. This ambiguity matrix provides a solution space in which to unambiguously estimate the correct fundamental from a given harmonic set $H = f_o * [1\ 2\ 3\ 4\ 5\ 6\ 7\ 8\ 9\ \ldots]$, and to resolve ambiguities associated with multiple solutions (i.e., that would otherwise result in other possible sub-harmonic sets being selected such as $J = f_o * [2\ 4\ 6\ 8\ \ldots]$ or $K = f_o * [3\ 6\ 9\ 12\ 15\ \ldots]$ etc.) This allows the application of data filters such as harmonograms which provide a unique capability for improved tracking, contact correlation and situational awareness.

BRIEF DESCRIPTION OF THE DRAWINGS

Other objects, features, and advantages of the present invention will become more apparent from the following detailed description of the preferred embodiment and certain modifications thereof when taken together with the accompanying drawing in which.

DETAILED DESCRIPTION OF THE PREFERRED EMBODIMENT

Figure 1:
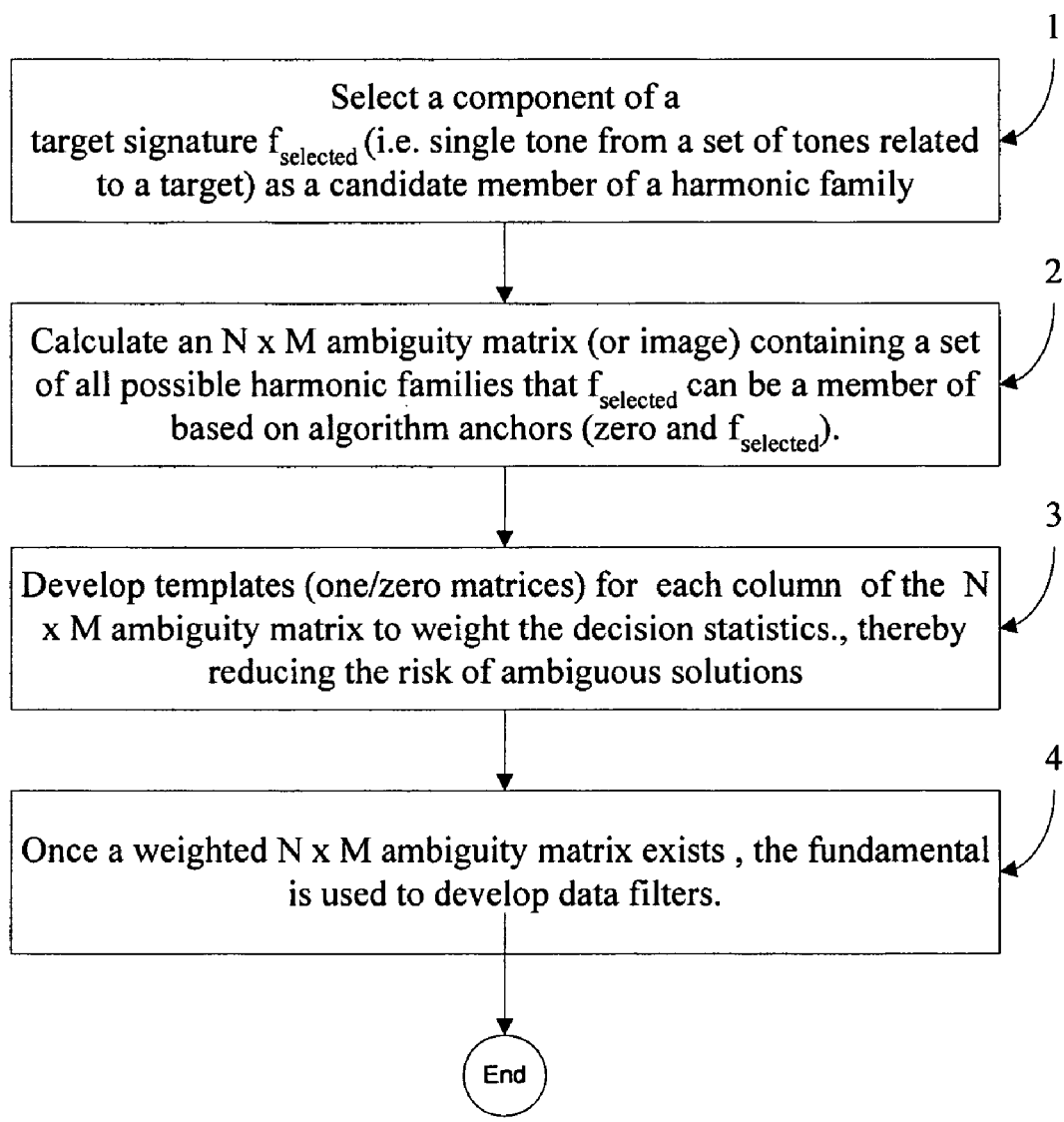
FIG. 1 is a step-wise block diagram of the method for resolving harmonic ambiguity and inter-array harmonic tracking according to the preferred embodiment of the present invention.

Referring now to FIG. 1, there is shown a block diagram of the method for resolving harmonic ambiguity and inter-array harmonic tracking according to the present invention, which calculates a complete set of possible harmonic families given the automatic or manual selection of a target frequency from a frequency spectrum. The present method may be used to improve performance of a detection system such as a passive sonar system, for example, in which detected target signals are displayed to an operator. The method generally comprises the following steps:

1) Select a component of a target signature $f_{selected}$ (i.e. single tone from a set of tones related to a target) as a candidate member of a harmonic family.
2) Calculate an N×M ambiguity matrix (or image) containing a set of all possible harmonic families that $f_{selected}$ can be a member of based on algorithm anchors (zero and $f_{selected}$).
3) Develop templates (one/zero matrices) for each column of the N×M ambiguity matrix to weight the decision statistics, thereby reducing the risk of ambiguous solutions.
4) Use the fundamental to develop data filters.

These four steps are detailed below.

Step One:

A Sonar Operator (or an "Automated Detection Algorithm") selects a component of a target signature (i.e. single tone from a set of tones related to a target) as a candidate member of a harmonic family. At this point the only assumption is that the selected tone, $f_{selected}$, must be the $n^{th}$ harmonic partial of the harmonic set where n must be less than or equal to the number of harmonic members considered (i.e. n<=N). The selected tone $f_{selected}$ need not be the fundamental of the harmonic set. For example, given a 3.44 Mhz source, there should be the 3.44 Mhz fundamental frequency and a family of harmonics inclusive of a second, third, fourth . . . nth harmonic. At some point the harmonics become difficult to resolve, and this determines the number N. For present purposes, we assume that N=5 harmonics and $f_{selected}$ is arbitrarily chosen to be the third harmonic at 10.32 Mhz, approximately ⅓ the amplitude of the fundamental.

Step Two:

Following step 1, an N×M ambiguity matrix (or image) is formed. The matrix contains a set of all possible harmonic families that $f_{selected}$ can be a member of. The first row of the matrix (starting from the bottom and working up, for the sake of clarity) will contain a set of fundamentals calculated as follows:

$$H\_set (f_o) [f_{selected}/(N), f_{selected}/(N-1), f_{selected}/(N-2), *f_{selected}/(2), f_{selected}]$$

Subsequent rows of the matrix are calculated (sequentially) as:

$(N)*H\_set(f_o)$;

$(N-1)*H\_set(f_0)$ $(N-2)*H\_set(f_o)$;

$3*H\_set(f_o)$;

$2*H\text{-}set(f_o)$;

$1*H\_set(f_o)$.

In our simple example the N×M ambiguity matrix will appear substantially as follows:

| $f_{selected}$ = 10.32 Mhz | | | | | |
|---|---|---|---|---|---|
| (5) * H_set ($f_o$) | 10.32 | 12.9 | 17.2 | 25.8 | 51.6 |
| (4) * H_set ($f_o$) | 8.256 | 10.32 | 13.76 | 20.64 | 41.28 |
| (3) * H_set ($f_o$) | 6.192 | 7.74 | 10.32 | 15.48 | 30.96 |
| (2) * H_set ($f_o$) | 4.128 | 5.16 | 6.88 | 10.32 | 20.64 |
| H_set ($f_o$) | 2.064 | 2.58 | 3.44 | 5.16 | 10.32 |

Thus, the assumption made in step 1 provides a pair of algorithm anchors (i.e. zero and $f_{selected}$) that afford substantial search space reduction (reducing an infinite search space, to a finite search space), and increased processing speed. The matrix also enhances the ability to resolve ambiguities associated with multiple solutions. For example, for a given harmonic set $H = f_o * [1\ 2\ 3\ 4\ 5\ 6\ 7\ 8\ 9\ \ldots]$ will result in other possible sub-harmonic sets being selected such as $J = f_o * [2\ 4\ 6\ 8\ \ldots]$ or $K = f_o * [3\ 6\ 9\ 12\ 15\ \ldots]$, etc.

Step Three:

Following step 2, the amplitudes of the signals at the appropriate frequencies (as identified by the matrix above) are used to weight the various hypotheses. The hypothesis that the selected frequency is the third harmonic has the largest amplitude signals and would be the correct solutions for the simple case. The matrix below is representative of a typical output (for the case $f_{selected}$=10.32 Mhz is the third harmonic):

| $f_{selected}$ = 10.32 Mhz | | | | | |
|---|---|---|---|---|---|
| (5) * H_set ($f_o$) | 1 | 0 | 1 | 0 | 1 |
| (4) * H_set ($f_o$) | 0 | 1 | 1 | 1 | 1 |
| (3) * H_set ($f_o$) | 0 | 0 | 1 | 0 | 1 |
| (2) * H_set ($f_o$) | 0 | 0 | 1 | 1 | 1 |
| H_set ($f_o$) | 0 | 0 | 1 | 0 | 1 |

Step Four:

In view of the foregoing description it should be apparent that the foregoing method provides a pair of algorithm anchors (i.e., zero and $f_{selected}$) that affords substantial search space reduction (reducing an infinite search space, to a finite search space) and increased processing speed. The ambiguity matrix approach enhances the ability to resolve ambiguities associated with multiple solutions (i.e a given harmonic set H=$f_o$*[1 2 3 4 5 6 7 8 9 . . . ] that would otherwise result in other possible sub-harmonic sets being selected such as J=$f_o$*[2 4 6 8 . . . J or K=$f_o$*[3 6 9 12 15 . . . ] etc.)

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

What is claimed is:

1. A method for resolving harmonic ambiguity from a frequency spectrum, said method comprising the steps of:
    selecting a single frequency ($f_{selected}$) from a frequency spectrum;
    assuming that the selected frequency ($f_{selected}$) is an nth harmonic partial of a harmonic set H=fo*[1 2 3 4 5 6 7 8 9 . . . n] of all harmonic partials N within said frequency spectrum under a constraint that n<N;
    deriving an N×M ambiguity matrix consisting of all possible harmonic sets H associated with the selected frequency ($f_{selected}$) that $f_{selected}$ could be a member of, where N comprises all possible harmonic members {integers of from 1 to N} and M comprises all possible hypothetical fundamentals {$f_o$=$f_{selected}$/(1 thru N)}, said ambiguity matrix providing a finite solution space for estimation of a correct fundamental frequency $f_o$ from said harmonic set H=$f_o$*[1 2 3 4 5 6 7 8 9 . . . n]; and
    resolving ambiguities associated with multiple solutions that would otherwise result in other possible sub-harmonic sets being selected.

2. The method for resolving harmonic ambiguity from a frequency spectrum according to claim 1, wherein a first bottom row of said N×M ambiguity matrix contains a set of fundamentals calculated as follows:

$$H\_set(f_o)=[f_{selected}/(N), f_{selected}/(N-1), f_{selected}/(N-2), \ldots f_{selected}/(2), f_{selected}].$$

3. The method for resolving harmonic ambiguity from a frequency spectrum according to claim 2, wherein subsequent rows moving up said N×M ambiguity matrix contain sets of fundamentals calculated sequentially as follows:

(N)*H-set($f_o$);

(N-1)*H-set($f_o$);

(N-2)*H-set($f_o$);

3*H-set($f_o$);

2*H-set($f_o$);

1*H-set($f_o$).

4. The method for resolving harmonic ambiguity from a frequency spectrum according to claim 1, wherein said step of resolving ambiguities comprises developing weighted one/zero matrices for each column of the N×M ambiguity matrix to weight the decision statistics, thereby reducing the risk of ambiguous solutions.

5. The method for resolving harmonic ambiguity from a frequency spectrum according to claim 4, wherein the weighted one/zero matrices for each column of the N×M ambiguity matrix are weighted in accordance with amplitudes of signals.

6. The method for resolving harmonic ambiguity from a frequency spectrum according to claim 5, further comprising the step of applying the weighted one/zero matrices to each column of the N×M ambiguity matrix to determine the hypotheses providing the largest amplitude signals, thereby determining the correct solution.

7. A method for resolving harmonic ambiguity from a frequency spectrum, comprising the steps of:
    selecting a component of a target signature $f_{selected}$ consisting of a single tone from a set of tones related to a target, as a candidate member of a harmonic family;
    calculating an N×M ambiguity matrix comprising a set of all possible harmonic families that $f_{selected}$ can be a member of based on two anchors, zero and $f_{selected}$ where N comprises all possible harmonic members (integers of from 1 to N) and M comprises all possible hypothetical fundamentals ($f_o$=$f_{selected}$/(1 thru N));
    calculating templates comprising one/zero matrices for each column of the N×M ambiguity matrix in order to weight the columns to reduce the risk of ambiguous solutions; and developing data filters based on the weighted matrix.

8. The method for resolving harmonic ambiguity from a frequency spectrum according to claim 7, wherein a first bottom row of said N×M ambiguity matrix contains a set of fundamentals calculated as follows:

$$H\_set(f_o)=[f_{selected}/(N), f_{selected}/(N-1), f_{selected}/(N-2), \ldots f_{selected}/(2), f_{selected}].$$

9. The method for resolving harmonic ambiguity from a frequency spectrum according to claim 8, wherein subsequent rows (working up) of said N×M ambiguity matrix contain sets of fundamentals calculated sequentially as follows:

(N)*H-set($f_o$);

(N-1)*H-set($f_o$);

(N-2)*H-set($f_o$);

3*H-set($f_o$);

2*H-set($f_o$);

1*H-set($f_o$).

10. The method for resolving harmonic ambiguity from a frequency spectrum according to claim 7, wherein said step of calculating templates comprises developing weighted one/zero matrices for each column of the N×M ambiguity matrix to weight the decision statistics, thereby reducing the risk of ambiguous solutions.

11. The method for resolving harmonic ambiguity from a frequency spectrum according to claim 10, wherein the weighted one/zero matrices for each column of the N×M ambiguity matrix are weighted in accordance with amplitudes of signals.

12. The method for resolving harmonic ambiguity from a frequency spectrum according to claim 11, further comprising the step of applying the weighted one/zero matrices to each column of the N×M ambiguity matrix to determine the hypotheses providing the largest amplitude signals, thereby determining the correct solution.

13. A method for harmonic tracking of a target signature from a frequency spectrum, comprising the steps of:
  selecting a component of a target signature $f_{selected}$ consisting of a single tone from a set of tones related to said target signature, as a candidate member of a harmonic family;
  calculating an N×M ambiguity matrix comprising a set of all possible harmonic families that $f_{selected}$ can be a member of based on two anchors, zero and $f_{selected}$ where N comprises all possible harmonic members (integers of from 1 to N) and M comprises all possible hypothetical fundamentals ($f_o=f_{selected}/(1$ thru N)); and
  calculating templates comprising one/zero matrices for each column of the N×M ambiguity matrix in order to weight the columns to reduce the risk of ambiguous solutions; and developing data filters based on the weighted matrix.

14. The method for harmonic tracking of a target signature from a frequency spectrum according to claim 13, wherein a first bottom row of said N×M ambiguity matrix contains a set of fundamentals calculated as follows:

$$H\_set(f_o)=[f_{selected}/(N), f_{selected}/(N-1), f_{selected}/(N-2), \ldots f_{selected}/(2), f_{selected}].$$

15. The method for harmonic tracking of a target signature from a frequency spectrum according to claim 14, wherein subsequent rows moving up said N×M ambiguity matrix contain sets of fundamentals calculated sequentially as follows:

(N)*H-set($f_o$);

(N-1)*H-set($f_o$);

(N-2)*H-set($f_o$);

3*H-set($f_o$);

2*H-set($f_o$);

1*H-set($f_o$).

16. The method for harmonic tracking of a target signature from a frequency spectrum according to claim 14, wherein said step of calculating template comprises developing weighted one/zero matrices for each column of the N×M ambiguity matrix to weight the decision statistics, thereby reducing the risk of ambiguous solutions.

17. The method for harmonic tracking of a target signature from a frequency spectrum according to claim 16, wherein the weighted one/zero matrices for each column of the N×M ambiguity matrix are weighted in accordance with amplitudes of signals.

18. The method for harmonic tracking of a target signature from a frequency spectrum according to claim 17, further comprising the step of applying the weighted one/zero matrices to each column of the N×M ambiguity matrix to determine the hypotheses providing the largest amplitude signals, thereby determining the correct solution.

* * * * *